United States Patent [19]

Kokubu et al.

[11] Patent Number: 4,788,474

[45] Date of Patent: Nov. 29, 1988

[54] DIMMER APPARATUS

[75] Inventors: Sadao Kokubu; Koji Takizawa, both of Kani; Takao Sakakibara, Kasugai; Makoto Okada, Nagoya, all of Japan

[73] Assignee: Kabushiki Tokai Rika Denki Seisakusho, Aichi, Japan

[21] Appl. No.: 936,243

[22] Filed: Dec. 1, 1986

[30] Foreign Application Priority Data

Dec. 4, 1985 [JP] Japan ............................ 60-186002
Dec. 16, 1985 [JP] Japan ............................ 60-192138
Mar. 31, 1986 [JP] Japan ............................ 61-046101

[51] Int. Cl.⁴ ............................................. H05B 37/00
[52] U.S. Cl. .................................... 315/119; 315/287; 315/307
[58] Field of Search ............... 315/119, 194, 246, 287, 315/307, DIG. 4

[56] References Cited

U.S. PATENT DOCUMENTS 3,243,653  3/1966  Locklin ............................ 315/194
4,570,108  2/1986  Stroede et al. ................... 315/208

Primary Examiner—David K. Moore
Attorney, Agent, or Firm—Nixon & Vanderhye

[57] ABSTRACT

An improved dimmer apparatus which can protect an output power transistor for a lamp of a load when the lamp is short-circuited and which can eliminate manual operation for restarting the apparatus after recovery of the short-circuiting of the lamp. The apparatus comprises a detecting circuit which detects short-circuiting of the lamp to turn the transistor off. After lapse of a predetermined interval of time given by a timer circuit, the transistor is turned on to detect whether or not the lamp is still short-circuited. If the lamp is still short-circuited, the transistor is again turned off and then a same sequence of operations will be repeated until it is detected that the short-circuiting of the lamp has been recovered and thus a normal operation of the apparatus is restarted.

4 Claims, 5 Drawing Sheets

DIMMER APPARATUS

BACKGROUND OF THE INVENTION

This invention relates to a dimmer apparatus of the type wherein a transistor for controlling a lamp to be dimmed is protected when the lamp becomes short-circuited.

Various dimmer apparatus have been developed and widely used so far. In such conventional dimmer apparatus, the resistance of a variable resistor is varied to change the duty ratio of an oscillation circuit which switches an output power transistor on and off to cause a lamp load to flicker in order to effect dimming of the lamp.

If such a lamp becomes short-circuited by some cause, an output power transistor may be broken by an excessive current. Therefore, such conventional dimer apparatus are designed to prevent destruction of an output power transistor by interrupting a possible excessive current by means of a thin track on a printed circuit board or the like when a lamp becomes short-circuited.

However, such conventional dimmer apparatus have a drawback that once the thin track is broken, a dimmer apparatus will no longer operate unless it is repaired, for example, by replacing a circuit board.

SUMMARY OF THE INVENTION

It is an object of the present invention to provide a dimmer apparatus wherein an output power transistor for driving a lamp load can be protected when the lamp is short-circuited.

It is another object of the invention to provide a dimmer apparatus wherein an output power transistor for driving a lamp load can be protected when the lamp is short-circuited and a normal operation of the apparatus can be restarted automatically if the short-circuiting of the lamp has been recovered after lapse of a predetermined interval of time after such short-circuiting of the lamp.

According to one aspect of the present invention, there is provided a dimmer apparatus, comprising: an oscillation circuit operable to change an on/off duty ratio thereof either in response to an input voltage from a rheostat light control or by means of a variable resistor; a driver circuit including an output power transistor which cycles on and off in response to an output of said oscillation circuit; a dimmer lamp connected to be lit up by said driver circuit; a detecting circuit for detecting a current flow through said lamp when said lamp is short-circuited; a holding circuit operable in response to a detection output of said detecting circuit for holding said output power transistor of said driver circuit in an off state; and a timer circuit for producing a period of time for which the detecting operation of said detecting circuit is cyclically performed while said lamp is shrotcircuited.

According to another aspect of the invention, there is provided a dimmer apparatus, comprising: an oscillation circuit operable to change an on/off duty ratio thereof either in response to an input voltage from a rheostat light control or by means of a variable resistor; a driver circuit including an output power transistor which cycles on and off in response to an output of said oscillation circuit; a dimmer lamp connected to be lit up by said driver circuit; a detecting circuit for detecting a current flow through said lamp when said lamp is short-circuited and for developing a detection output to cause said output power transistor of said driver circuit to be switched into an off state; and a timer circuit operable upon detection of short-circuiting of said lamp by said detecting circuit for determining an interval of time for which said output power transistor of said driver circuit is to be held in the off state and for causing said output power transistor to be switched into an on state again after lapse of the thus determined interval of time.

Thus, according to the present invention, if the lamp to be dimmed becomes short-circuited, the detecting circuit detects such short-circuiting of the lamp and renders the output power transistor of the driver circuit into an off state. Accordingly, the output power transistor is protected from destruction, such as, for example, from burning thereof. Further, after lapse of the predetermined interval of time after the output power transistor has once been turned off, the lamp is energized again in order to detect whether or not the lamp still remains short-circuited. If the lamp remains short-circuited, the output power transistor is again turned off in order to effect another detecting operation after the predetermined interval of time, but on the contrary if the short-circuiting of the lamp has been recovered, a normal operation of the apparatus is resumed automatically without the necessity of manual operation.

DESCRIPTION OF THE PREFERRED EMBODIMENTS

Figure 1:
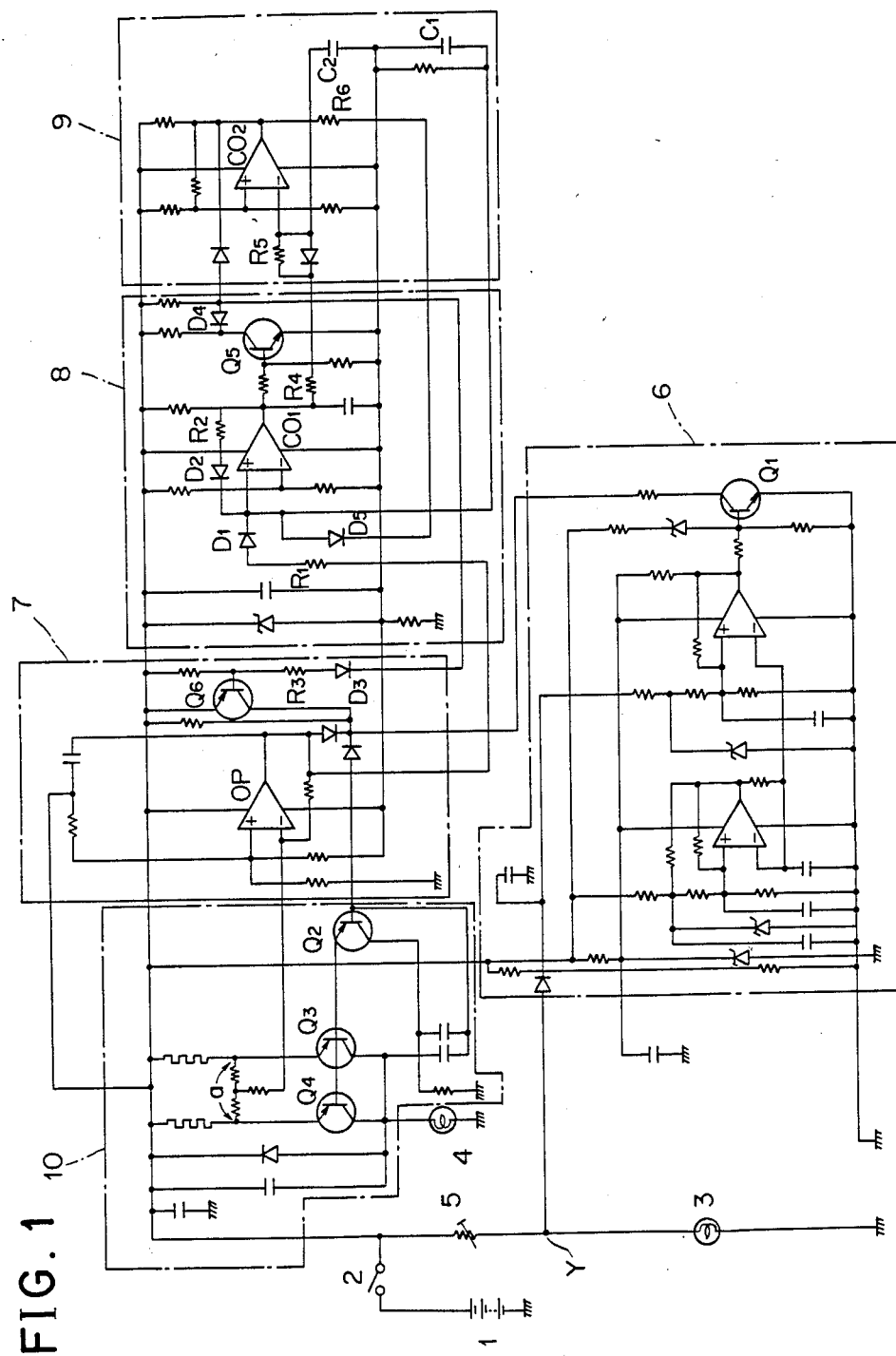
FIG. 1 is a circuit diagram showing a dimmer apparatus according to a first embodiment of the present invention.

Referring first to FIG. 1, there is illustrated a dimmer apparatus according to a first embodiment of the invention. The dimmer apparatus shown includes a power source 1 such as a battery carried on a car, a light switch 2, a lamp 3 which is apt to be damaged by noise such as, for example, a lamp for illuminating a radio carried on a car, another lamp 4 which requires to be dimmed, and a dimming variable resistor 5.

The dimmer apparatus further includes a known oscillation circuit 6 the duty ratio of which varies in response to the resistance of the variable resistor 5, a detecting circuit 7 for detecting whether or not the lamp 4 is short-circuited and for limiting, upon detecting of such short-circuiting, the current flow of output power transistors of a driver circuit 10 which will be described hereinbelow, and a holding circuit 8 operable after lapse of a fixed interval of time (for example, 0.3 seconds) after detection of short-circuiting of the lamp 4 by the detecting circuit 7 for holding the output power transistors of the driver circuit 10 to an off state and for operating a timer circuit 9 mentioned below. The dimmer apparatus further includes the timer circuit 9 for releasing the holding circuit 8 after lapse of a fixed interval of time (for example, 30 seconds) after the output power transistors have been switched off, and the driver circuit 10 which is operable to switch the output power transistors on and off in accordance with the duty ratio of the oscillation circuit 6 for energizing the lamp 4 while the output power transistors are kept released from holding by the holding circuit 8.

Now, operation of the dimmer apparatus having such a construction as described above will be described. At first, the light switch 2 is closed.

Consequently, the lamp 3 is energized via the variable resistor 5 by the power source 1 so that it is lit up with a brightness corresponding to a resistance of the variable resistor 5. Meanwhile, power is supplied also to the oscillation circuit 6 so that the oscillation circuit 6 starts its oscillations with a duty ratio determined in accordance with a voltage Y applied to the lamp 3, that is, a transistor $Q_1$ at the final stage of the oscillation circuit 6 begins to cycle on and off.

As the transistor $Q_1$ thus cycles on and off, a transistor $Q_2$ of the driver circuit 10 also cycles on and off and hence output power transistors $Q_3$ and $Q_4$ also cycle on and off. As a result, the lamp 4 flickers and is thus dimmed in accordance with the duty ratio of the oscillation circuit 6.

As the output power transistors $Q_3$, $Q_4$ thus cycle on and off, the potential at points a at the emitters of the output power transistors $Q_3$, $Q_4$ is substantially equal to the voltage of the power source 1 when the transistors $Q_3$, $Q_4$ are off, and when the transistors $Q_3$, $Q_4$ are on, the potential at the points a is lower than the voltage of the power source 1. Thus, an operational amplifier OP provides an output which varies in response to a potential at the points a (when the potential at the points a is substantially equal to the voltage of the power source 1, the operational amplifier OP provides a low output voltage, and to the contrary when the potential drops from the voltage of the power source 1, the output of the operational amplifier OP rises accordingly). In this instance, however, the output voltage of the operational amplifier OP does not exceed a detection level of a comparator $CO_1$ of the holding circuit 8. Consequently, the transistor $Q_2$ of the driver circuit 10 continues its dimming operation under control of the oscillation circuit 6 while no influence is had on the timer circuit 9 nor on the holding circuit 8.

Now, operation of the dimmer apparatus when the lamp 4 becomes short-circuited will be described.

It is assumed that the oscillation circuit 6 is oscillating with a particular duty ratio. Here, if the lamp 4 becomes short-circuited, an excessive current will flow when the output power transistors $Q_3$, $Q_4$ are on. Consequently, the potential at the points a drops, and hence the output of the operational amplifier OP in the detecting circuit 7 rises and finally exceeds the detection level of the comparator $CO_1$ (in a normal oscillating state, the potential at the points a does not exceeds the detection level of the comparator $CO_1$). It is to be noted that when the output power transistors $Q_3$, $Q_4$ are off, the potential at the points a is substantially equal to the voltage of the power source 1, and hence the output of the operational amplifier OP in the detecting circuit 7 is low.

And, if an excessive current flows when the output power transistors $Q_3$, $Q_4$ are on, the output of the operational amplifier OP rises. This raises a base voltage to the transistor $Q_2$ so that the emitter current of the transistor $Q_2$ is decreased thereby. This reduces the base currents to the output transistors $Q_3$, $Q_4$ so that the collector currents of the output transistors $Q_3$, $Q_4$ are decreased thereby. As a result, the output transistors $Q_3$, $Q_4$ are protected.

And when the lamp 4 becomes short-circuited, the output of the operational amplifier OP exceeds the detection level of the comparator $CO_1$ when the output power transistors $Q_3$,$Q_4$ are on. Accordingly, a capacitor $C_1$ is charged via a resistor $R_1$ and a diode $D_1$ by the output of the operational amplifier OP. In this instance, when the duty ratio is high, the charging time for the capacitor $C_1$ is short, and on the contrary when the duty ratio is low, the charging time is long. The potential of the capacitor $C_1$ appears at a positive terminal of the comparator $CO_1$ in the holding circuit 8. Thus, if the potential at the positive terminal exceeds a potential at a negative terminal of the comparator $CO_1$ (0.3 seconds in the present embodiment), the output of the comparator $CO_1$ becomes a high level. Consequently, a current continues to flow to the capacitor $C_1$ via a resistor $R_2$ and a diode $D_2$ so that the terminal voltage of the capacitor $C_1$ holds its high level thereby to lock the comparator $CO_1$ to provide an output of a high level.

As the comparator $CO_1$ provides an output of the high level, a transistor $Q_5$ is turned on so that a base current of another transistor $Q_6$ of the detecting circuit 7 flows through a resistor $R_3$, diodes $D_3$, $D_4$ and the transistor $Q_5$. Consequently, the transistor $Q_6$ is turned on so that the base potential to the transistor $Q_2$ of the driver circuit 10 rises to turn the transistor $Q_2$ off, which turns the output power transistors $Q_3$, $Q_4$ off. Accordingly, the output power transistors $Q_3$, $Q_4$ are protected.

Meanwhile, as the output of the comparator $CO_1$ becomes a high level, a capacitor $C_2$ begins to be charged via resistors $R_4$, $R_5$ so that its terminal voltage, that is, the voltage at a negative input terminal of a comparator $CO_2$, gradually rises. If the terminal voltage to the comparator $CO_2$ finally exceeds a positive terminal voltage the comparator $CO_2$ now provides an output of a low level. Consequently, the charge of the capacitor $C_1$ is discharged via a diode $D_5$ and a resistor $R_6$. As a result, the positive terminal voltage to the comprator $CO_1$ drops thus below the negative terminal voltage, which causes the comparator $CO_1$ to now provide an output of a low level. In the present embodiment, the interval of time to this point is about 30 seconds. Thus, as the output of the comparator $CO_1$ becomes a low level, the transistor $Q_5$ is turned off, which causes the transistor $Q_6$ to be turned off. Consequently, the transistor $Q_2$ is turned on to allow the output power transistors $Q_3$, $Q_4$ to cycle on and off with the duty ratio of the oscillation circuit 6 to effect dimming of the lamp 4.

In this state, if the short-circuiting of the lamp 4 is not yet recovered, the same series of operations when the lamp 4 became short-circuited as described above will be repeated to hold the output power transistors $Q_3$, $Q_4$ off in order to protect the output power transistors $Q_3$, $Q_4$.

To the contratry, if the short-circuiting of the lamp 4 has been recovered then, for example, by replacement of the lamp 4, or by natural recovery after instantaneous short-circuiting of the lamp 4 by some cause where the lamp 4 used is of the dual filament type, the circuit will operate for normal operation to dim the lamp 4.

Figure 2:
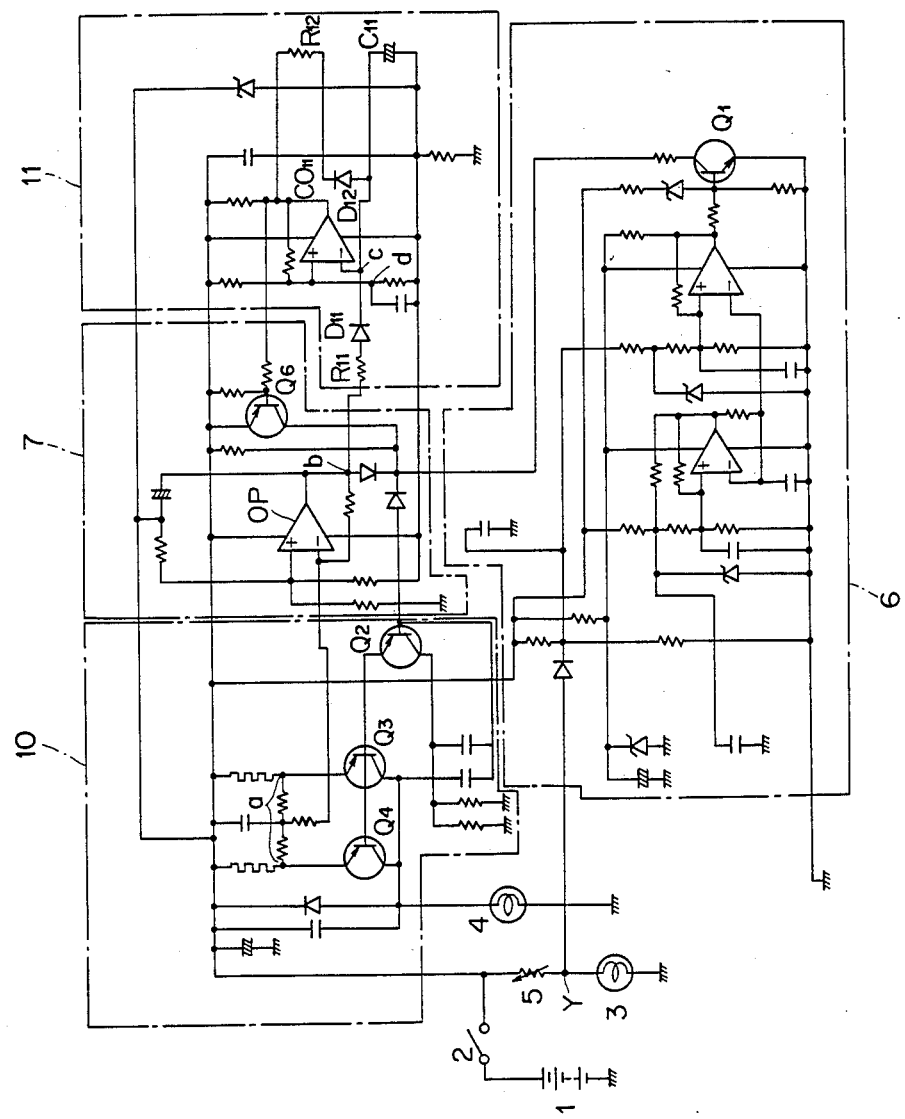
FIG. 2 is a similar view but showing a dimmer apparatus according to a second embodiment of the invention.

Referring now to FIG. 2, there is illustrated a dimmer apparatus according to a second embodiment of the invention. In FIG. 2, like parts or components are denoted by like reference symbols to those of FIG. 1, and detailed description thereof will be omitted herein to avoid redundancy.

The dimmer apparatus of FIG. 2 is mainly different in construction from the dimmer apparatus of FIG. 1 in that a timer circuit denoted at 11 is provided instead of the holding circuit 8 and the timer circuit 9 of the dimmer apparatus of FIG. 1. The timer circuit 11 operates after lapse of a fixed interval of time (for example, 0.3 seconds) after detection of short-circuiting of a lamp 4 by a detecting circuit 7 to hold output power transisotrs of a driver circuit 10 to an off state and then cause energization of the lamp 4 again after lapse of a fixed interval of time (for example, 30 seconds) corresponding to a time constant given by a time constant circuit. Thus, while the output power transistors are kept released from holding by the timer circuit 11, the driver circuit 10 operates to switch the output power transistors on and off in accordance with the duty ratio of an oscillation circuit 6 to energize the lamp 4.

Now, construction of the timer circuit 8 will be described in conjunction with operations of the dimmer apparatus. However, since normal operation of the dimmer apparatus of FIG. 2 is similar to that of the dimmer apparatus of FIG. 1, description thereof will be omitted herein. It is to be noted here that the voltage of an output of the detecting circuit 7 in normal operation of the apparatus does not at all exceed or rise above a detection level $CO_{11}$ of the timer circuit 11.

It is assumed that the oscillation circuit 6 is oscillating with a particular duty ratio. Here, if the lamp 4 becomes short-circuited, an excessive current will flow when the output power transistors $Q_3$, $Q_4$ are on. Consequently, the potential at the points a drops, and hence the output of the operational amplifier OP in the detecting circuit 7 rises and finally exceeds the detection level of the comparator $CO_{11}$ (in a normal oscillating state, the potential at the points a does not exceeds the detection level of the comparator $CO_1$). It is to be noted that when the output power transistors $Q_3$, $Q_4$ are off, the potential at the points a is susbstantially equal to the voltage of the power source 1, and hence the output of the operational amplifier OP in the detecting circuit 7 is low.

Meanwhile, if an excessive current flows when the output power transistors $Q_3$, $Q_4$, are on, the output of the operational amplifier OP rises. Consequently, a charging current flows into a capacitor $C_{11}$ via a resistor $R_{11}$ and a diode $D_{11}$ so that the terminal voltage of the capacitor $C_{11}$ rises. Thus, if finally the terminal voltage of the capacitor $C_{11}$ exceeds a potential at a point d (when the output of the comparator $CO_{11}$ is of a high level), the output of the comparator $CO_{11}$ changes from a high level to a low level. As the output of the comparator $CO_{11}$ thus changes to a low level, a transistor $Q_6$ of the detecting circuit 7 is turned on, which turns a transistor $Q_2$ off to turn the transistors $Q_3$, $Q_4$ off thereby to interrupt energization of the lamp 4. Accordingly, the transistors $Q_3$, $Q_4$ are protected.

Here, if the output of the comparator $CO_{11}$ changes to a low level, the charge of the capacitor $C_{11}$ is discharged to the potential at the point d (when the output of the comparator $CO_{11}$ is of a low level) via a resistor $R_{12}$ and a diode $D_{12}$. Thus, after lapse of a fixed interval of time corresponding to a time constant given by the resistor $R_{12}$ and the diode $D_{12}$ together with the capacitor $C_{11}$, the output of the comparator $CO_{11}$ changes to a high level again. Consequently, the transistor $Q_6$ is turned off, which turns the transistor $Q_2$ on so that the output power transistors $Q_3$, $Q_4$ are turned on to light up the lamp 4 as in a normal operation.

In this state, if the lamp 4 remains still short-circuited, the same series of operations will be repeated to turn the output power transistors $Q_3$, $Q_4$ off. Accordingly, protection of the output power transistors $Q_3$, $Q_4$ will continue until a normal condition of the dimmer apparatus is restored.

Figure 3:
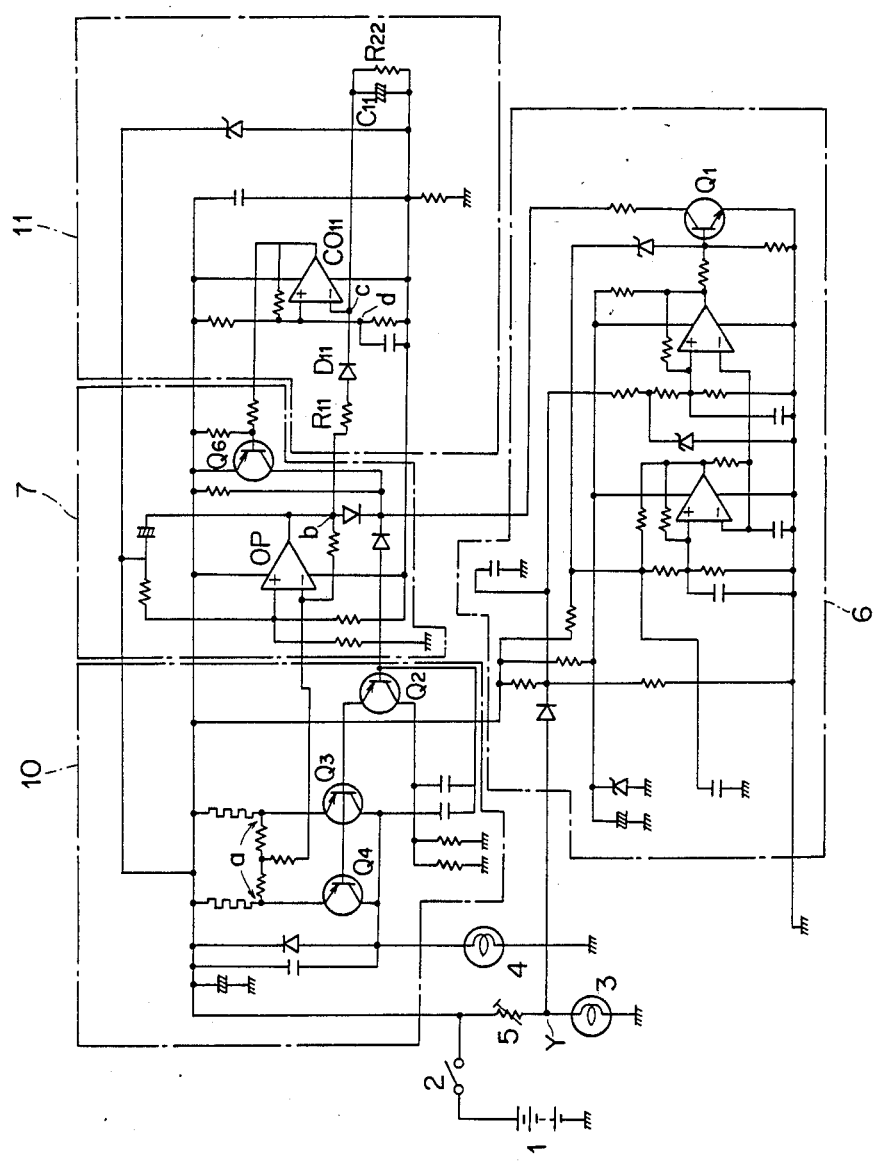
FIG. 3 is a similar view but showing a dimmer apparatus according to a third embodiment of the invention.

Referring now to FIG. 3, there is illustrated a dimmer apparatus according to a third embodiment of the invention. In FIG. 3, like parts or components are denoted by like reference symbols to those of FIGS. 1 and 2, and detailed description thereof will be omitted herein.

The dimmer apparatus of FIG. 3 is very similar to the dimmer apparatus of FIG. 2 and is only different in construction of a discharging circuit for the capacitor $C_{11}$ of the time constant circuit in the timer circuit 11. Accordingly, description will be given only of such a discharging circuit of the dimmer apparatus of FIG. 3.

If a lamp 4 becomes short-circuited so that the output of an operational amplilier OP changes to a high level causing the capacitor $C_{11}$ to be charged until the output of the comparator $CO_{11}$ changes to a low level, the charge of the capacitor $C_{11}$ is discharged via a resistor $R_{22}$. Thus, after lapse of a predetermined interval of time given by a time constant circuit consisting of the capacitor $C_{11}$ and the resistor $R_{22}$, the output of the comparator $CO_{11}$ changes to a high level. Consequently, energization of the lamp 4 is initiated in a similar manner as described hereinabove.

Figure 6:
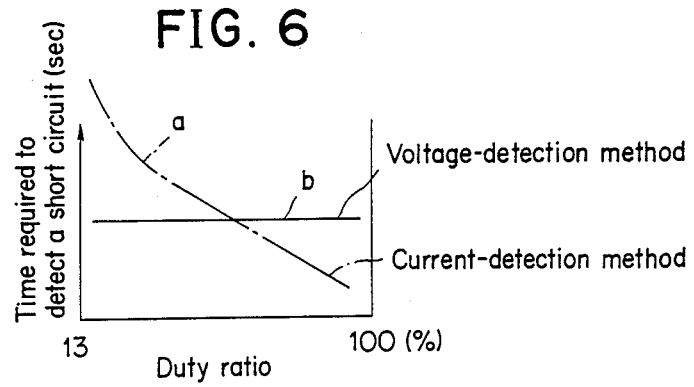
FIG. 6 is a relationship between the time required to detect the short circuit and the duty ratio of the output of the oscillator circuit for short-circuit voltage detection method and short-circuit current detection method.

A curve a in FIG. 6 shows a relationship between the time required to detect a short circuit of a lamp and the duty ratio of the oscillator circuit 6 in current-detection method above mentioned. When the duty ratio is low the time required to detect the short circuit is long because the current supplied from a detecting curcuit 7 for charging the capacitor $C_{11}$ is low due to a short on-period of transistors $Q_3$ and $Q_4$.

On the other hand, a curve b in FIG. 6 shows a relationship between the time required to detect the short circuit of the lamp and the duty ratio of the oscillator circuit in voltage-detection method (not shown diagramatically) in which the time is constant regardless of the duty ratio of the oscillator 6.

In a dimmer apparatus shown in FIG. 3, because of employment of current-detection method for detecting a short circuit of a lamp the time required to detect the short circuit of a lamp the time required to detect the short circuit is long when the duty ratio of the output of the oscillator is low.

In addition, a momentary short circuit is often difficult to be detected.

On the other hand, in a dimmer apparatus employing voltage-detection method. The time required for detecting a short circuit is constant regardless of the duty ratio. Therefore even when the duty ratio is high it requires as long time as it requires when the duty ratio is low. And transistor $Q_4$ may not be protected.

Figure 4:
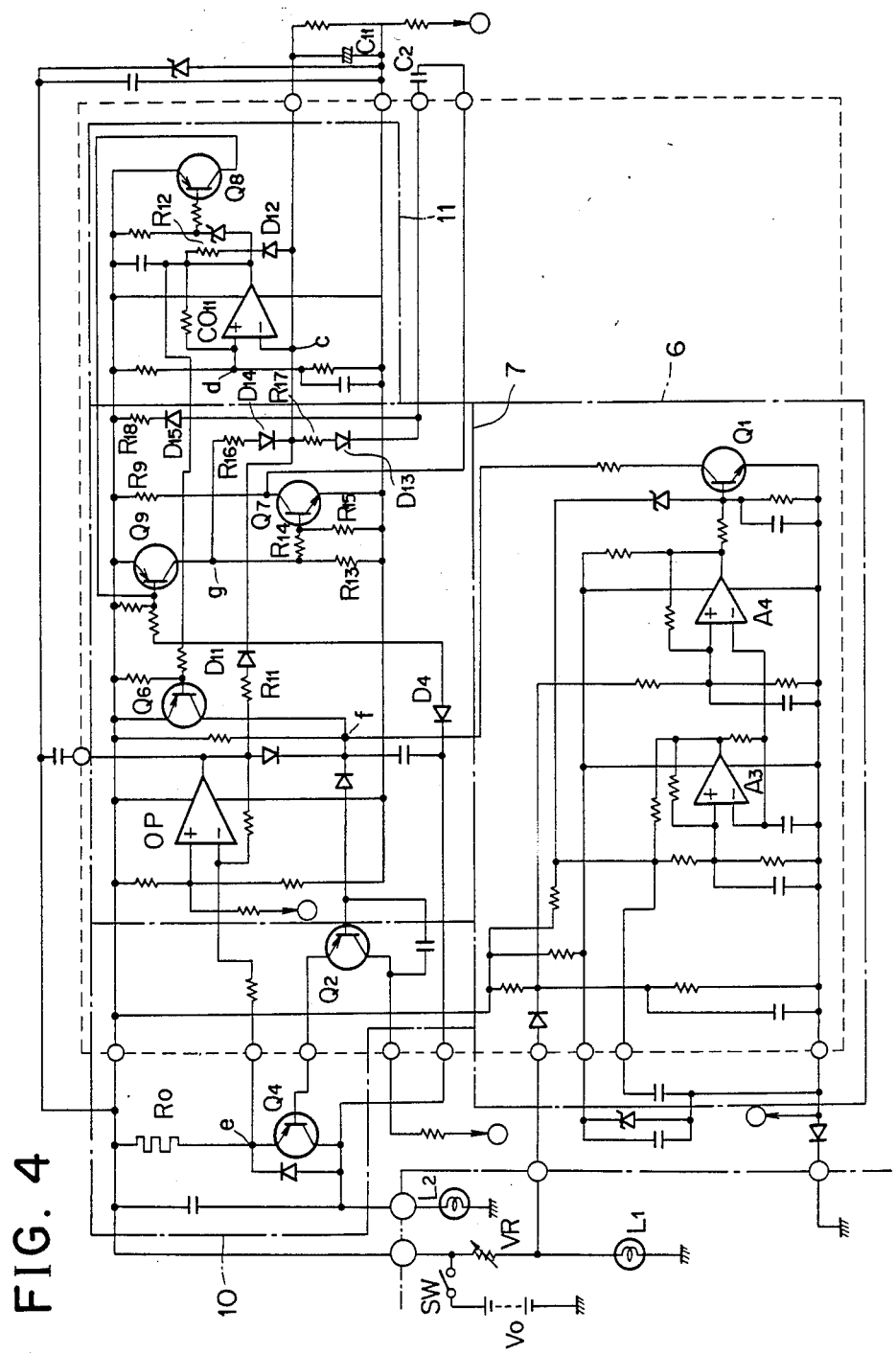
FIG. 4 is a circuit diagram showing a dimmer apparatus according to a fourth embodiment of the present invention.

Consequently the fourth embodiment shown in FIG. 4 is to protect the drive transistor, by combining the current-detection method and the voltage-detection method, in such a way that the time required to detect the short circuit is determined by mainly a circuit for detecting a short-circuit voltage when the duty ratio is low, and by both the circuit for detecting the short-circuit voltage and a circuit for detecting the short-circuit current when the duty ratio is high.

Referring now to FIG. 4, there is illustrated a dimmer apparatus according to the fourth embodiment of the present invention. In FIG. 4, like parts or components are denoted by like reference symbols to those of FIG. 1, FIG. 2, and FIG. 3.

The circuit for detecting the short-circuit voltage includes transistors $Q_9$, $Q_7$, and their peripheral circuit, and is illustrated as follows.

The base of the transistor $Q_9$ is connected to lamp $L_2$ through diode $D_4$ and the collector of the transistor $Q_9$ is connected to the capacitor $C_{11}$ through a resistor $R_{16}$ and a diode $D_{14}$.

The collector of the transistor $Q_9$ is also connected to the base of the transistor $Q_7$ through a resistor $R_{13}$, $R_{14}$, and $R_{15}$.

A capacitor $C_2$ is connected to the collector of the transistor $Q_7$ at its one electrode and to the capacitor $C_{11}$ (cathode of a diode $D_{14}$) through a diode $D_{13}$ and a resistor $R_{17}$ at its other electrode.

The base of transistor $Q_9$ is also connected to the collector of a transistor $Q_8$ and the transistor $Q_8$ is connected to the output of a comparator $CO_{11}$ of a timer circuit 11.

In the case that the duty ratio of the output of the oscillator circuit 6 is high (for example nearly 100%), when the dimmer apparatus is working normally the collector voltage of the transistor $Q_4$ is high for most of the time in each period of the output of oscillator 6 and hence the transistor $Q_9$ is substantially off. And a voltage at a negative input terminal of the comparator is lower than that at a positive input terminal, and the output of the comparator $CO_{11}$ is high. Consequently a transistor $Q_6$ is off and the transistors $Q_2$ and $Q_4$ repeat becoming on and off in response to a transistor $Q_1$ which repeats becoming on and off, thus the lamp $L_2$ is properly dimmed. Since the duty ratio is high the transisotr $Q_1$ is on for most of the time in each period of the input to its base, and so are the transistors $Q_2$ and $Q_4$.

If the lamp $L_2$ is short-circuited an excessive current flows through a resistor $R_0$, and a voltage at point e, the emitter voltage of the transistor $Q_4$ decreases. And therefore a voltage at a negative input terminal of the operational amplifier OP decreases and the output of the operational amplifier OP becomes high causing the charging current to flow into the capacitor $C_{11}$ through a resistor $R_{11}$ and a diode $D_{11}$. Since the transistor $Q_9$ also becomes on, a voltage at point g, the collector voltage increases and another charging current flows into the capacitor $C_{11}$ through a resistor $R_{16}$ and a diode $D_{14}$.

When a voltage at point c, the negative input terminal of the comparator $CO_{11}$ increases owing to these charging currents and exceeds a voltage at point d, the positive input terminal of the comparator $CO_{11}$. And then the output of the comparator $CO_{11}$ becomes low.

The transistor $Q_6$ becomes on, and a voltage at point f, the collector voltage of the transistor $Q_6$ goes up causing the transistors $Q_2$ and $Q_4$ to become off. The output of the operational amplifier OP goes low, and charging the capacity $C_{11}$ through the resistor $R_{11}$ and the diode $D_{11}$ stops. Because a transistor $Q_8$ connected to the output of comparator $CO_{11}$ becomes on, the transistor $Q_9$ becomes off and the voltage at point g goes low causing the charging $C_{11}$ through the resistor $R_{16}$ and the diode $D_{14}$ to stop.

The capacitor $C_{11}$ starts discharging through a diode $D_{12}$ and a resistor $R_{12}$, and the voltage at point c, the voltage at the negative input terminal of the comparator $CO_{11}$ goes down toward the voltage at the positive input terminal of the comparator $CO_{11}$. When the voltage at point c, due to a hysterisis characteristics of the comparator $CO_{11}$, goes down lower than the voltage at point d the output of the comparator becomes high and the transistor $Q_6$ becomes off. And if the lamp $L_2$ is no longer short-circuited, it is again dimmed properly as mentioned previously, but if it is still short-circuited, the transistors $Q_2$ and $Q_4$ are driven to become off upon the short circuit detection as mentioned above.

As illustrated above, when the duty ratio of the output of the oscillator is high the time required for detecting the short-circuit is determined by combination of charging the capacitor $C_{11}$ upon detection of short-circuit current and charging the capacitor $C_{11}$ upon detection of short-circuit voltage.

In the case that the duty ratio of the output of the oscillator 6 is low, when the lamp $L_2$ is in normal state the transistor $Q_9$ repeats becoming on and off in response to the on and off state of the transistor $Q_4$.

When the transistor $Q_9$ is on, the charging current flows into the capacitor $C_{11}$ through the resistor $R_{16}$ and the diode $D_{14}$. Since the transistor $Q_7$ becomes on in response to the transistor $Q_9$ the charge stored in the capacitor $C_{11}$ is discharged into a capacitor $C_2$ through a resistor $R_{17}$ and a diode $D_{13}$. When the transistor $Q_9$ is off, therefore $Q_7$ is off, the collector voltage of the transistor $Q_7$ goes up and the $C_2$ is discharged through the resistor $R_{18}$, the diode $D_{15}$ and a resistor $R_9$. In the other hand the charging current into the capacitor $C_{11}$ will not flow as the output of the operational amplifier OP is low.

The capacitor $C_{11}$ is charged and discharged alternately as mentioned above and subsequently the voltage at point c is held lower than that at point d. The output of the comparator $CO_{11}$ remains high and the lamp is dimmed normally.

When the lamp is short-circuited the transistor $Q_9$ becomes on and the output of the operational amplifier OP goes high causing the charging current to flow into the capacitor $C_{11}$. And the short circuit is detected.

Figure 5:
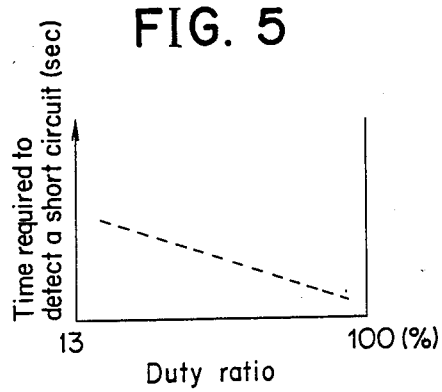
FIG. 5 is a relationship between the time required to detect the short circuit and the duty ratio of the output of the oscillator circuit in the fourth embodiment.

The relationship between the time required to detect the short circuit and the duty ratio of the output of the oscillator circuit 6 is shown in FIG. 5.

Figure 7:
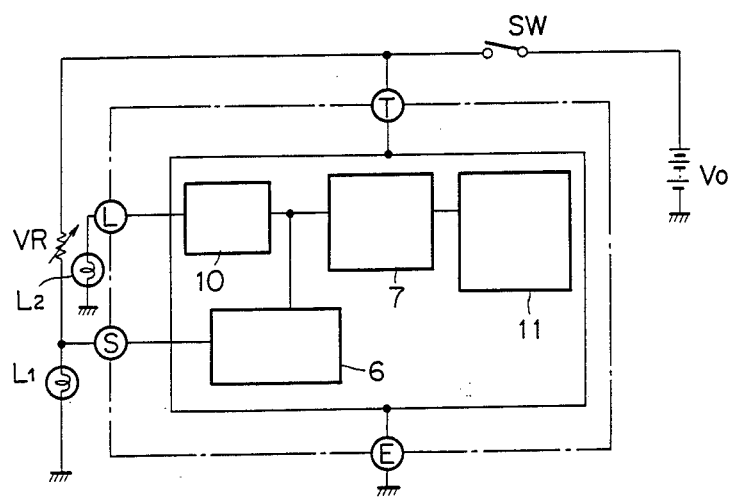
FIG. 7 is a block diagram showing a dimmer apparatus according to a fourth embodiment of the invention.

A block diagram of the fourth embodiment is shown in FIG. 7.

A block 6 is an oscillator circuit.

When a lamp $L_2$ is short-circuited a detector circuit 7 detects the short-circuiting and causes a control circuit to disable a driver circuit 10 for protecting a transistor driving the lamp $L_2$. The control circuit is incorporated in the detector circuit 7.

A timer circuit 11 causes the control circuit to release the driver circuit 10 after lapse of a predetermined interval of time from the time point when the control circuit disables the driver circuit. If the lamp 2 is no longer short-circuited, the control circuit allows the driving circuit 10 to operate normally again.

In a dimmer apparatus according to the present invention, when a lamp being dimmed is short-circuited a detection circuit detects it and causes output power transistors of a driver circuit to become off. And therefore the transistors are protected from damage such as burn-out.

The dimmer apparatus has a self diagnostic feature that the detection circuit will check, a predetermined period of time after the first detection of the short circuit, whether or not the lamp is still short-circuited, and if it is short-circuited, the output transistors are brought to off, if not, the output transistors start to drive the lamp normaly. Consequently it is not necessary to restart the apparatus manually after the short circuit is eliminated if the short circuit is momentary and transistory for some reason.

If the dimmer apparatus is provided with both the detector of short-circuit current and the detector of short-circuit voltage the time required to detect the short-circuit can be shortened considerably compared to an apparatus with only a current detector when the duty ratio of the output of the oscillator is low and the desired time to detect the short circuit can be obtained by combined effect of the detection of short-circuit current and the detection of short-circuit voltage.

What is claimed is:

1. A dimmer apparatus, comprising:
    an oscillation circuit operable to change an on/off duty ratio thereof in response to one of input voltage from a rheostat light control and a variable resistor;
    a driver circuit including at least one output power transistor cyclically switched in response to an output of said oscillation circuit;
    at least one dimmer lamp being lit up by said driver circuit;
    protecting means for protecting said output power transistor when said lamp becomes short-circuited, said protecting means comprising:
        a detecting circuit for detecting short circuit current flowing through said lamp while said lamp is short-circuited, said detecting circuit including an operational amplifier responsive to a power source voltage;
        a holding circuit including a first comparator for holding said output power transistor in an off-state after a first predetermined time period in response to a detection signal of said detecting circuit; and
        a timer circuit including a second comparator for releasing said off-state of said output power transistor to an on-state after a second predetermined time period has passed since said output power transistor was turned off when said lamp is no longer short-circuited;
    said protecting means functioning to repeat said detecting of said short circuit current and said holding of said output power transistor in an off-state if said lamp is short circuited until said lamp is no longer short-circuited, operation of said apparatus being resumed automatically when said lamp is no longer short-circuited.

2. A dimmer apparatus as claimed in claim 1, wherein said first predetermined time period is shorter than said second predetermined time period.

3. A dimmer apparatus as claimed in claim 2, wherein said predetermined time period is selected to be approximately 0.3 seconds, and said second predetermined time period is selected to be approximately 30 seconds.

4. A dimmer apparatus as claimed in claim 1, and further including a variable resistor connected to said oscillation circuit.

* * * * *